United States Patent [19]

Parker et al.

[11] Patent Number: 4,910,450

[45] Date of Patent: Mar. 20, 1990

[54] LOW COST THREE PHASE ENERGY ECONOMIZER

[75] Inventors: Louis W. Parker, 2040 N. Dixie Hwy., Ft. Lauderdale, Fla. 33305; Lowell C. Hahn, Ft. Lauderdale, Fla.

[73] Assignee: Louis W. Parker, Ft. Lauderdale, Fla.

[21] Appl. No.: 379,853

[22] Filed: Jul. 14, 1989

[51] Int. Cl.[4] .............................................. H02P 5/40
[52] U.S. Cl. ..................................... 318/811; 318/798
[58] Field of Search ............... 318/798, 799, 800, 801, 318/807, 810, 811, 812, 729, 371, 138, 832, 727

[56] References Cited

U.S. PATENT DOCUMENTS

| 4,070,605 | 1/1978 | Hoeppner | 318/809 |
| 4,242,625 | 12/1980 | Hedges | 318/812 |
| 4,384,243 | 5/1983 | Muskovac | 318/798 |
| 4,636,702 | 1/1987 | Hedges | 318/729 |
| 4,843,296 | 6/1989 | Tanaka | 318/801 |
| 4,864,212 | 9/1989 | Parker | 318/798 |

Primary Examiner—William M. Shoop, Jr.
Assistant Examiner—John W. Cabeca
Attorney, Agent, or Firm—Pollock, Vande Sande and Priddy

[57] ABSTRACT

An energy economizing AC power control system for energizing the stator windings of a three phase induction motor comprises an AC generator connected to the motor rotor shaft for generating an AC signal that is frequency modulated in response to load induced speed variations of the rotor, a variable resistance whose magnitude is responsive to the frequency modulated signal, an AC power proportioning switch which produces a single phase output consisting of pulses whose widths vary with variations in the magnitude of the variable resistance, a single phase-to-three phase converter coupled to the output of the proportioning switch for producing three control signals that occur respectively at the frequency of and during each voltage phase alternation of a three phase sine wave power supply, and three solid state switches that are respectively controlled by said control signals for controlling the time duration that each alternation of the three phase power supply is coupled via an associated one of the solid state switches to an associated one of the motor stator windings.

10 Claims, 8 Drawing Sheets

LOW COST THREE PHASE ENERGY ECONOMIZER

BACKGROUND

Parker/Hahn Disclosure Document No. 215628 filed Dec. 8, 1988 for "Improved Energy Economizer for Induction Motors," herein incorporated by reference, describes an invention that saves electrical energy normally wasted by lightly loaded single phase induction motors. It was pointed out in the said Disclosure Document that energy can be saved in polyphase motors by use of two or more of the energy economizers, one per phase, controlling the stator voltage applied to the motor. It was discovered by on-going research activities of the inventors that a single phase improved energy economizer can be used to control a three phase induction motor by the novel approach of adding a three phase converter to the single phase control which results in a significant cost reduction as compared to the use of three single phase controls, one per phase, being employed to control the stator voltage applied to each phase of a three phase motor. The present invention, in addition to lower cost, provides for a simple method of balancing the current in each of the phases and is inherently more reliable than three single phase controls being used to control a three phase motor. The present invention is disclosed and described by the following summary, description of preferred embodiments and drawings.

SUMMARY OF THE INVENTION

In accordance with the present invention, a standard three phase induction motor has its stator windings energized from a three phase sine wave alternating current (AC) power source through an energy economizer. The energy economizer is operative to automatically adjust the power consumed by the motor in proportion to the mechanical load acting on the motor at any moment, i.e., as the mechanical load on the motor increases, the energy economizer acts to meter additional power to the motor from the AC power source and as the mechanical load on the motor decreases, the energy economizer meters less power to the motor from the AC power source. The energy economizer, in this manner, conserves energy that would otherwise be wasted by an induction motor operating with mechanical loads that are less than the full design load of the motor.

The energy economizer is comprised of a load detection means, a frequency variable resistance means, an AC power proportioning switch means, a three phase converter means and a solid state power switch means all of which operate interdependently to automatically adjust the power supplied to the motor stator windings from the AC power source in response to rotor mechanical loading whenever the rotor speed is greater than 95% of synchronous speed.

BRIEF DESCRIPTION OF THE DRAWINGS

The foregoing objects, advantages, construction and operation of the present invention will become more readily apparent from a study of the following description of preferred embodiments and accompanying drawings wherein.

DESCRIPTION OF THE PREFERRED EMBODIMENTS

Figure 1:
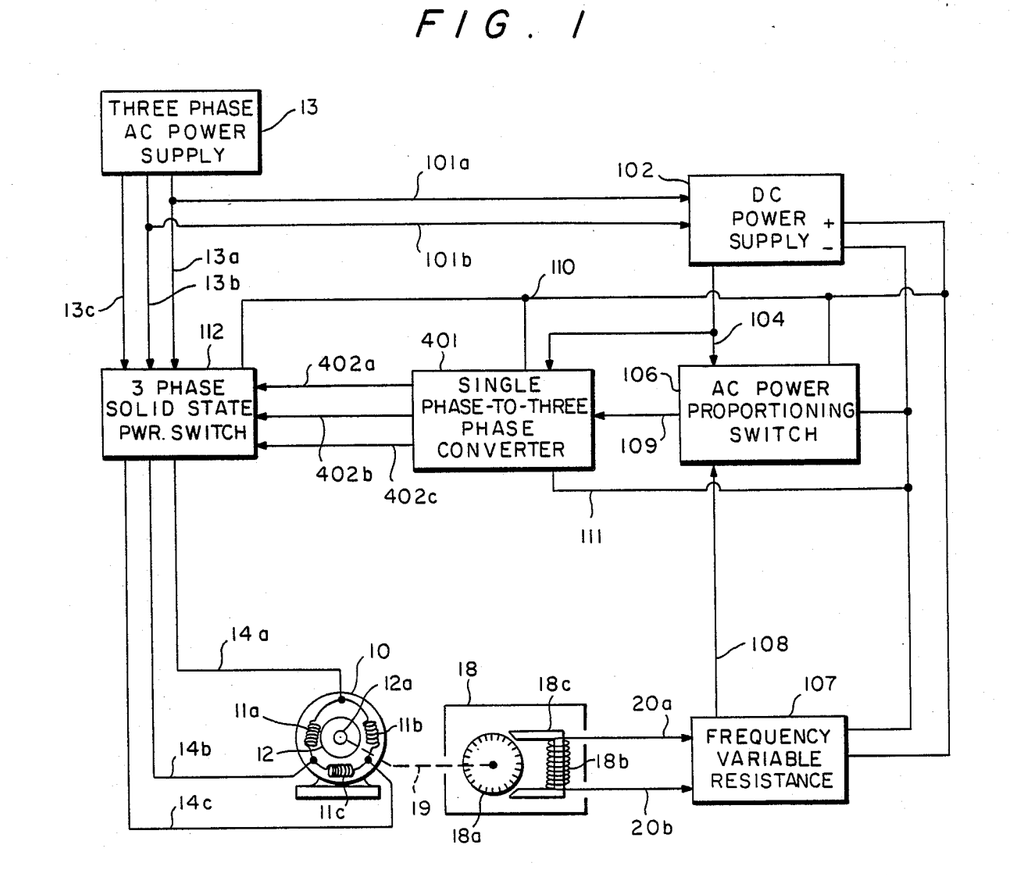
FIG. 1 is a block diagram of a three phase energy economizer motor control system constructed in accordance with the present invention.

As shown in FIG. 1, a standard three phase induction motor 10 is provided with a plurality of stator windingd 11a, 11b and 11c, and a rotor 12 having a shaft 12a adapted to be coupled to a mechanical load. An AC power source 13 is normally coupled directly to the stator windings 11a, 11b and 11c to energize the said stator windings thereby causing rotation of the rotor 12 and hence, the rotor shaft 12a. In accordance with the present invention, this normal energization circuit is interrupted and AC power source 13, instead of being directly coupled to the said stator windings of motor 10, is coupled to the input side of three phase solid state power switch 112 (SSPS 112) via conductors 13a, 13b and 13c. The output side of SSPS 112 is then respectively coupled to stator windings 11a, 11b and 11c via conductors 14a, 14b and 14c. It shall be noted that the three phase AC power source 13 supplies three separate AC voltages that are essentially equal in amplitude and frequency, but each of the three phase alternations are separated in time by 120 electrical degrees.

SSPS 112 may be a three phase thyristor power switch comprised of multiple triac assemblies or multiple silicon controlled rectifier assemblies which are regulated by appropriate control signals generated by a single phase-to-three phase converter (TPC) 401 whose operation, in turn, is controlled by the output signal from a single AC power proportioning switch (PPS)-106 via conductor 109 and a synchronizing (sync) signal provided from DC power supply (DCPS) 102 via conductor 104. PPS 106 operation is controlled by a variable resistance coupled to conductor 108 and by the sync signal applied via conductor 104. The varying resistance acting on conductor 108 is made to be proportional to the load on motor 10 and inversely proportional to the rotor 12 speed by frequency variable resistance (FVR) 107 responding to a frequency modulated AC signal produced by AC generator 18 which is mechanically coupled to rotor shaft 12a.

More particularly, a small AC generator 18 is mounted, as at 19, on the rotor shaft 12a of induction motor 10 for rotation therewith. Generator 18 produces a high frequency AC signal whose frequency varies with variations in the speed of rotation of rotor shaft 12a. This frequency modulation, i.e., the change of frequency of the AC signal appearing at AC generator 18 outputs 20a and 20b, is a function of rotor slip and, therefore, of the load on the motor. The said AC signal is applied to the input of FVR 107 which converts the variations in frequency of the said AC signal to a resistance that varies in magnitude as a function of the frequency modulation of the said AC signal at motor speeds above 95% of synchronous speed. The variable resistance is coupled to conductor 108 and is operative, in cooperation with sync signal 104, to control the output of PPS 106. The various preferred electronic circuits which comprise PPS 106, FVR 107, DCPS 102, TPC 401 and SSPS 112 will be more fully described in reference to FIGS. 2, 3, 4, 5 and 6. For the present, it suffices to note that the variable resistance acting on conductor 108, the sync signal on conductor 104 and a DC bias signal derived from the positive DC voltage on conductor 110 are combined to cause a field effect transistor (FET) switch, which is a part of PPS 106, to turn ON and OFF for a portion of, and in synchronism with, each voltage alternation of one phase of the three phase AC power source 13. The said voltage phase of AC power source 13 to which the said FET switch in PPS 106 is synchronized shall be referred to hereinafter as the AC reference phase. The duration of time that the said FET switch is turned on during each voltage alternation of the reference phase is a function of the magnitude of the resistance acting on conductor 108 and, therefore, at near synchronous speeds, is a function of the load on induction motor 10.

The aforementioned FET switch is coupled to one input of TPC 401 via conductor 109 and the said FET switch, when turned on, completes a current path between the said input OF TPC 401 and the negative output of DCPS 102 which is coupled to conductor 111. The said negative output from DCPS 102 shall hereinafter be referred to as DCPS 102 common.

Switching the said input 109 of TPC 401 in cooperation with the sync signal input to TPC 401 via conductor 104 causes TPC 401 to produce three separate output pulse signals, one each on conductors 402a, 402b and 402c. These said three signals are equal in pulse width but are separated in time by 120 electrical degrees relative to the frequency of the AC reference phase. The three pulse signals are coupled to three triggering elements of SSPS 112 respectively coupled to conductors 402a, 402b and 402c. The said three triggering elements are part of SSPS 112 and each said element causes a thyristor power switch, also part of SSPS 112, to conduct current from a phase of AC power source 13 through a motor winding respectively coupled to the thyristor power switch whenever a pulse signal is applied to the said trigger element.

As previously herein noted, each voltage phase of the three phase AC power source 13 is separated by 120 electrical degrees and likewise the three pulse signal outputs of TPC 401 are separated by 120 degrees and the said pulse signals are synchronized to each alternation of the reference phase voltage, therefore one pulse signal output of TPC 401 will occur during each alternation of each voltage phase of AC power source 13. Correspondingly, the said pulse signals cause the trigger elements of each phase of SSPS 112 to trigger the thyristor power switch portion of SSPS 112 into a conducting state for a duration of each alternation of each voltage phase of AC power source 13 which then results in current flowing from the said AC power source through each respective phase of SSPS 112, thence through conductors 14a, 14b and 14c and respectively then through stator windings 11a, 11b and 11c. Since the duration of current condution from AC power source 13 through the said stator windings of motor 10 is thusly controlled by the pulse signal output of TPC 401 which is, in turn, controlled by PPS 106 responding to a resistance in FVR 107 varying directly proportional to motor load as derived from an FM AC signal produced by AC generator 18 coupled to shaft 12a of motor 10, then the said duration of the said stator current conduction is also directly proportional to motor load, i.e., stator current increases as motor load increases and stator current decreases as motor load decreases.

The AC generator 18 shown in FIG. 1 may be comprised of a ferro-magnetic toothed wheel 18a which is mounted at 19 on the rotor shaft 12a of induction motor 10 and cooperates with a stator comprised of permanent magnet 18c and winding 18b to produce an AC signal. This small AC generator 18 output frequency is modulated as determined by the nature of motor 10, the rotor 12 rotational speed and the number of teeth on wheel 18a. One output frequency of AC generator 18 is an integral multiple of the speed of rotation of the rotor 12 of motor 10 and may, for example, be 60 times the revolutions per second (RPS) of the said motor. For purposes of the subsequent description, it will be assumed that the rotor 12 of induction motor 10 rotates at a speed of 30 RPS when there is no mechanical load acting on the rotor shaft 12a and the said rotor speed decreases to 28.75 RPS when a load equal to the full rated load of the motor is applied to the said rotor shaft. The AC signal output from the small AC generator 18 connected to the said rotor shaft includes the frequency 1800 Hertz (Hz) when the said rotor speed is 30 RPS and the frequency of the said AC generator output signal includes the frequency 1725 Hz when the said rotor speed is 28.75 RPS. These parameters will be referred to hereinafter for purposes of illustration. It will be understood, however, that structures other than those shown in FIG. 1 can be employed to produce the desired AC output signal, and that the AC signal frequency may be other than that specified herein.

The AC signal output from the AC generator 18 is coupled to conductors 20a and 20b and the said conductors are coupled to the input of FVR 107, thus the AC signal is applied to the input of FVR 107. The functioning of FVR 107 may be more readily understood by referring to the electronic circuit illustrated in FIG. 2 and additionally to the response curves illustrated in FIGS. 2a and 2b.

Figure 2:
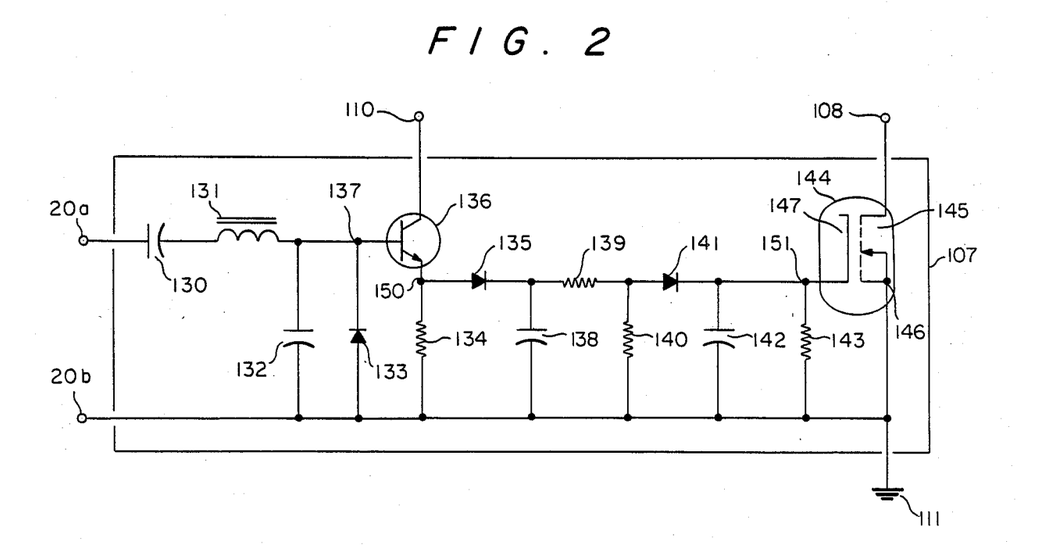
FIGS. 2, 2a and 2b are schematic diagrams and response curve graphs of a preferred electronic circuit that performs the frequency variable resistance function of the invention.

FVR 107 is comprised of a series resonant tuned power amplifier and half wave detector means, a peak rectifier means, a first filter and voltage divider means, a blocking diode and second filter means, and a voltage controlled resistor means, all of which function interdependently to convert a frequency modulated AC signal applied to the input into a resistance whose magnitude varies inversely proportional to the frequency modulation of the said AC signal. As shown in FIG. 2, the series resonant tuned power amplifier and half wave detector means includes capacitor 130, inductor 131, capacitor 132, node 137, clamping diode 133, transistor 136, node 150 and resistor 134; diode 135 is the peak rectifier means. The first filter and voltage divider means is comprised of capacitor 138, resistor 139, and resistor 140; the blocking diode and second filter means is comprised of diode 141, capacitor 142, node 151 and resistor 143; the voltage controlled resistor is FET 144.

A positive DC voltage is supplied to the power amplifier transistor 136 via conductor 110 and conductor 111 supplies DCPS common; the AC signal input to FVR 107 is via conductors 20a and 20b; the resistance signal output of FVR 107 is coupled to conductor 108.

The base-emitter junction of transistor 136 is tuned to resonance at 1850 Hz by capacitor 130, inductor 131 and capacitor 132 which are coupled in series between 20a and 20b. The resonant output of the series tuned circuit appears on node 137. Clamping diode 133 limits the amplitude of the negative alternations. Transistor 136 base-emitter junction half-wave detects the resonant AC input signal and normal transistor action between the said transistor base, collector, emitter junctions, the positive DC supply and the positive alternations of the AC input signal, provide power gain between nodes 137 and 150.

The voltage output of the half-wave detector at node 150 is amplitude modulated across resistor 134 directly proportional to the frequency modulation of the AC signal input. The conversion from frequency modulation - to -amplitude modulation is due to the series tuned base-emitter response characteristic of the tuned power amplifier-half wave detector which is graphically illustrated in FIG. 2a.

The half-wave amplitude modulated (AM) signal appearing at node 150 is peak rectified to a DC voltage level by diode 135 and the said DC voltage is first filtered by capacitor 138. The power gain of transistor 136 is sufficient to charge capacitor 138 through diode 135 to the peak voltage value of each alternation of the AM signal without detuning the series resonant circuit. Filter capacitor 138 will discharge slightly through voltage divider resistors 139 and 140 during the time between peak charging which results in a small ripple voltage appearing on the DC charge on capacitor 138. The DC voltage charge on capacitor 138 is directly proportional to the peak voltage of the half-wave AM signal on node 150 which, in turn, is directly proportional to the frequency modulation of the AC signal input and, since the AC signal frequency modulation is inversely proportional to the load on motor 10, then the DC voltage charge on capacitor 138 is also inversely proportional to the load on motor 10. The DC voltage charge on capacitor 138 is reduced in value by resistors 139 and 140, which, in combination, form a linear voltage divider network. This reduced value DC voltage is coupled to the second filter means via blocking diode 141. Second filter means capacitor 142 is charged to near the DC voltage level of the said reduced DC voltage appearing at the junction of resistors 139 and 140. The discharge path for capacitor 142 is through resistor 143 and the value of this said resistor is on the order of several million ohms, therefore the DC charge on capacitor 142 is virtually ripple free due to the aforementioned voltage division and the relatively long time constant of the second filter means. The virtually ripple free DC voltage charge on capacitor 142 is applied to the gate electrode of FET 144 as at node 151 and the virtually ripple free DC voltage becomes a DC control voltage level for FET 144 that is inversely proportional to the load on motor 10 at any moment. This said inversely proportional to motor 10 load DC voltage level on node 151 shall hereinafter be referred to as the DC control signal.

FET 144 has its drain electrode 145 connected to conductor 108 and its source electrode 146 connected to DCPS 102 common. The DC control signal applied to the gate electrode 147 of FET 144 causes the resistance between the said drain and source electrodes of the said FET to vary inversely proportional to the said DC control signal whenever the said DC control signal is greater than a certain positive value. The dynamic range of resistance variations between the said drain and source electrodes is very large in comparison to the DC control signal level variations, i.e., the drain 145-to-source 146 resistance (Rds) varies from several million ohms to several thousand ohms of resistance with only a few hundred thousandths of a volt (milli-volts) change in the DC voltage applied to the gate electrode 147 whenever the DC control signal so applied exceeds a certain DC voltage amplitude; DC voltage levels applied which are slightly higher than this said certain DC voltage level result in the FET-drain-to-source resistance stabilizing at a low ohmic value which is known as Rds ON and DC voltage levels applied to the gate electrode which are slightly less than this result in the drain-to-source resistance stabilizing at an extremely high ohmic value which is known as Rds OFF.

The DC signal is adjusted so as to be at a DC voltage level which causes FET 144 to be in the Rds OFF state so long as the frequency of the AC signal input to FVR 107 is less than 1700 Hz, which in turn means that the speed or rotor 12 is less than 95% of synchronous speed. The FM-to-AM conversion response characteristic of FVR 107 is adjusted so as to cause the said voltage level of the DC control signal to be at a control point that results in FET 144 being in the Rds ON state of several ohms if ever the frequency of the AC signal should be at 1850 Hz; however, as previously noted, the maximum frequency of the AC signal is 1800 Hz, which occurs when the rotor 12 is at synchronous speed, therefore the DC control signal level can never be at a control point that would result in FET 144 being in the Rds ON state.

Figure 2A:
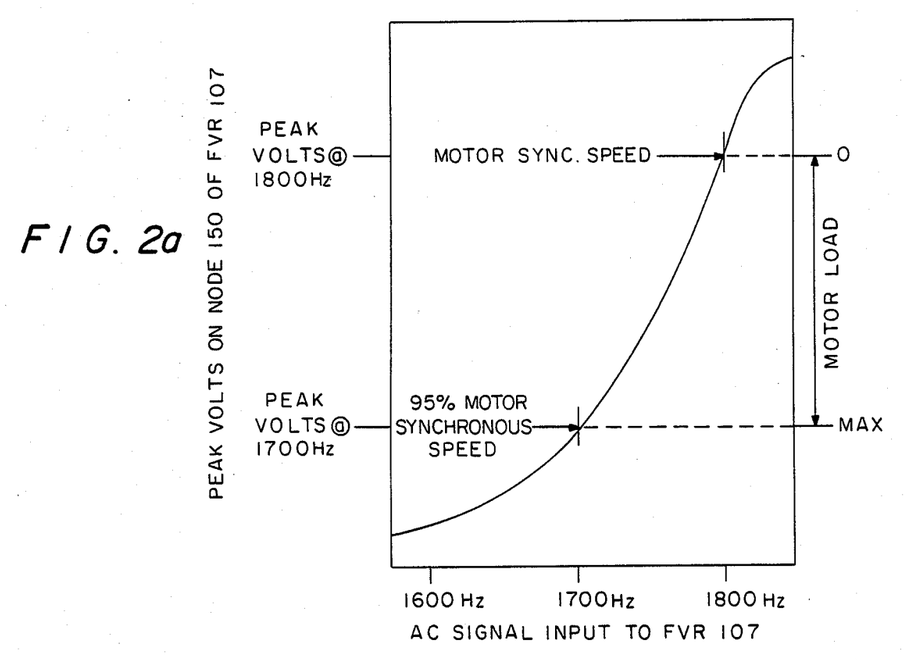
Figure 2B:
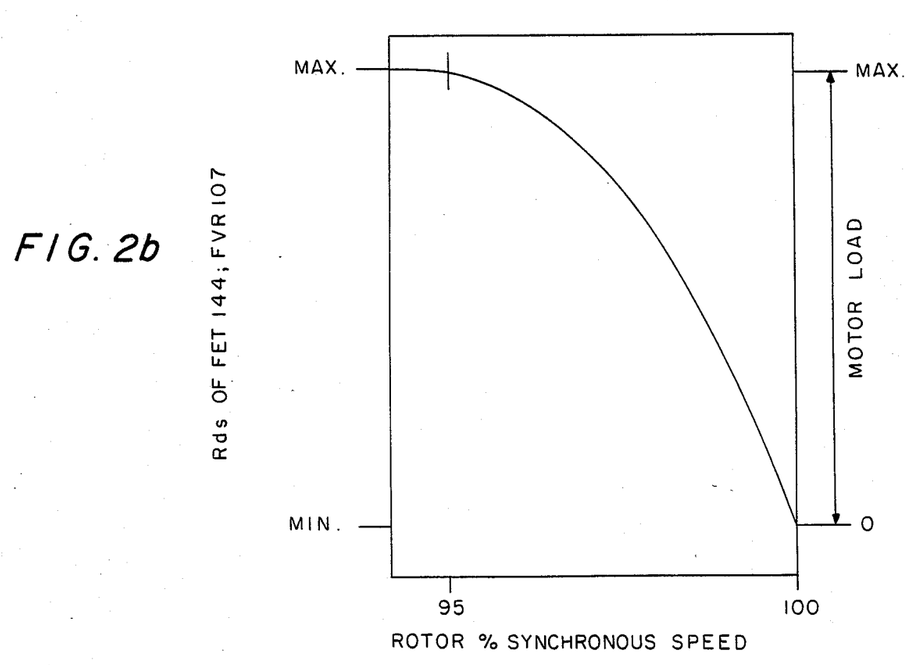

The ohmic dynamic control range of FET 144 that responds to the AC signal input to FVR 107 is graphically illustrated in FIG. 2b. As shown therein, the Rds of FET 144 is a few hundred thousand ohms when at the Min. value and the Max. value is Rds OFF which is in excess of 100 million ohms. The Rds ohmic value is reduced to approximately five million ohms at an AC signal input frequency of 1700 Hz, and is further reduced to an ohmic value of approximately 1.5 million ohms at 1725 Hz, and continues to non-linearly decrease in ohmic value until a minimum value of approximately three hundred thousand ohms results from an AC signal input of 1800 Hz.

Rotor 12 speed, as is well known in the art, changes linearly with linear changes in applied loads. It is also well known that the said rotor speed is inversely proportional to a load applied to it. Since generator 18 is mechanically coupled to rotor 12, then the AC signal frequency will vary linearly with rotor speed and hence the frequency modulation of the AC signal input to FVR 107 is load-linear; however, the response characteristic of the FVR 107 tuned amplifier-half wave detector is non-linear, as shown in FIG. 2A and, as previously noted herein, the ohmic response characteristic of FET 144 is also non-linear. The non-linear response characteristic of FET 144 is, however, approximately the inverse of the response characteristic of the tuned amplifier-half wave detector whenever the AC signal input is between 1700 Hz and 1800 Hz, therefore the non-linearities compensate one another within normal motor operating speeds, and this results in the Rds of FET 144 being load-linear whenever motor 10 speed is greater than 95% of synchronous speed. The Rds of FET 144 shall hereinafter be referred to as the resistance signal.

Figure 3:
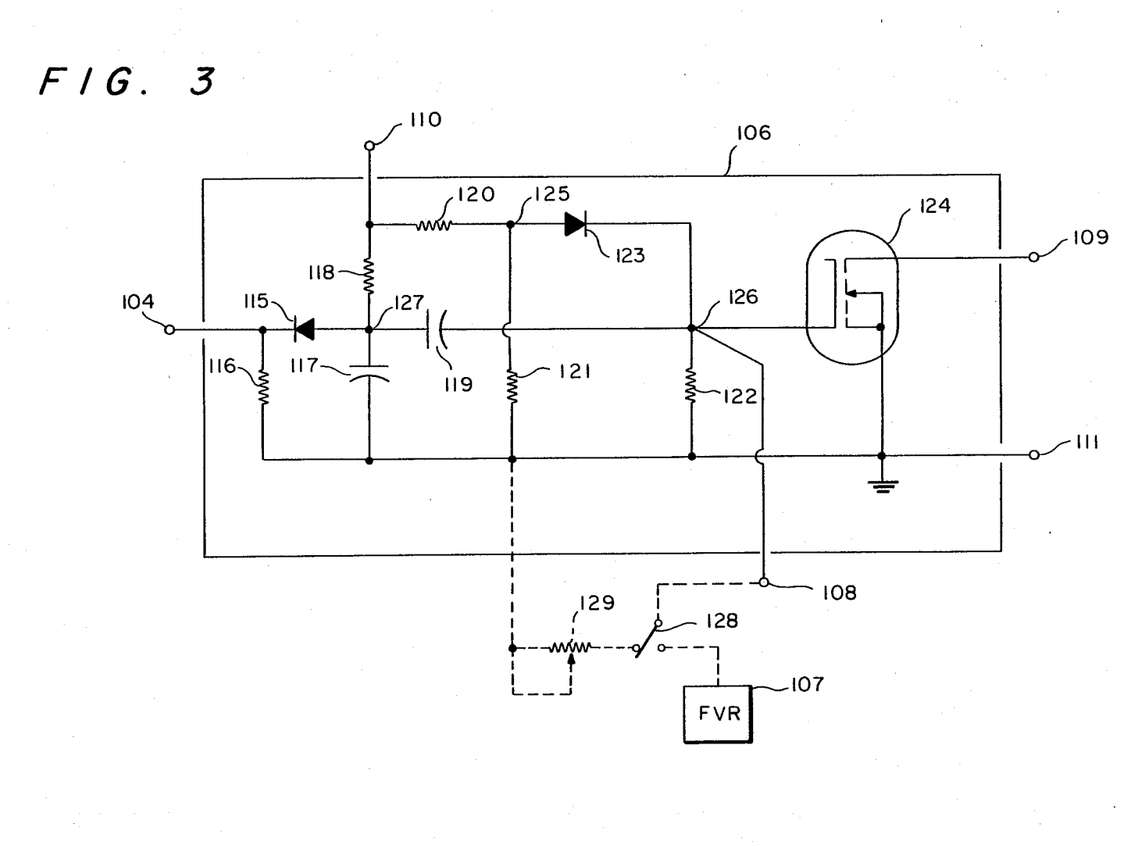
FIG. 3 is a schematic diagram of a preferred electronic circuit that performs the AC power proportioning switch function of the invention.

As previously noted, the resistance signal output of FVR 107 is connected between conductor 108 and DCPS 102 common, therefore the resistance between these two points varies directly proportional to the load on motor 10 when rotor 12 is greater than 95% of synchronous speed. Referring to FIG. 3 which is a schematic diagram of a preferred circuit that comprises PPS 106, it can be shown how the resistance signal output, by attenuation of a composite control signal, causes the power proportioning switch output pulse width to vary proportional to load. It shall be understood that PPS 106 could be used as a method of manually controlling the power applied to the stator windings of motor 10 simply by eliminating generator 18 and FVR 107 and coupling a potentiometer 129, shown by dashed lines, between conductor 108 and DCPS common 111, and also that automatic-manual selective modes of operation may be achieved by the simple addition of a single-pole, double throw switch 128 between potentiometer 129, the FVR 107 resistance signal and the conductor 108 input of PPS 106. A useful application of such an arrangement would be to manually control stator voltage during the starting of motor 10 in order to reduce and/or limit starting current and then switching to the automatic energy saving mode of operation after the motor is accelerated up to normal operating speed.

PPS 106 is comprised of a sawtooth generator means, AC coupling means, DC bias signal means, summing junction means and threshold switch means, all of which are interdependently operative to cause conductor 109 to be switched from a high resistance state to a low resistance state relative to DCPS common 111 for a time during each voltage alternation of the herein aformentioned reference phase, with the time duration of the low resistance state being directly proportional to the load on motor 10, i.e., the time duration of the low resistance state increases as the load on motor 10 increases and vice-versa.

The sawtooth generator means includes resistor 116, diode switch 115, capacitor 117, sync signal input 104, resistor 118 and sawtooth signal output node 127; AC coupling means is comprised of capacitor 119; DC bias signal means includes resistor 120, resistor 121, diode 123 and node 125; summing junction means includes resistor 122 and node 126; threshold switch means is FET switch 124.

Figure 6:
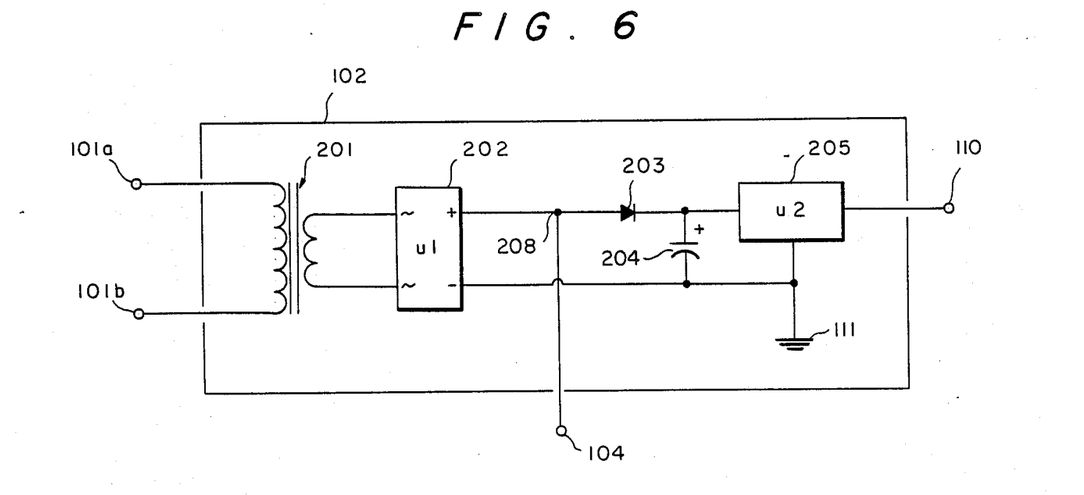
FIG. 6 is a schematic diagram of a preferred electronic circuit that performs the DC power supply function of the invention.
Figure 7A:
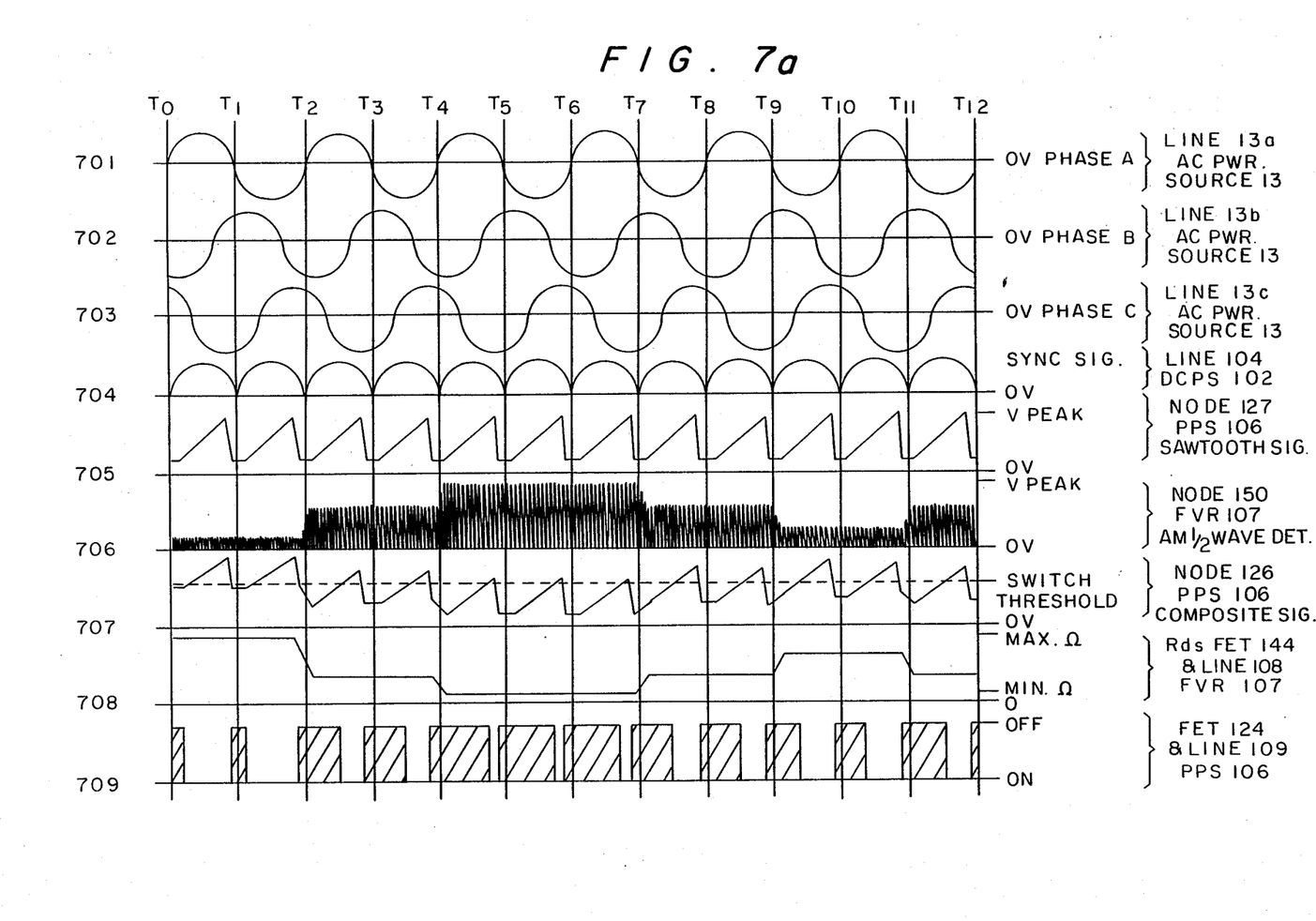
FIGS. 7a through 7c are a series of waveforms illustrating aspects of the invention.

The synchronizing signal (sync signal) appearing on conductor 104 is derived from DCPS 102 as illustrated in FIG. 6, node 208, and varies sinusoidally from zero volts to a peak positive voltage and back to zero volts in synchronism with each alternation of the AC power supply reference phase voltage as is illustrated in FIG. 7A, waveforms 701 and 704. The said sync signal is coupled to the cathode of diode switch 115 via line 104 and causes the said diode switch to be in a forward biased conducting state whenever the sync signal voltage amplitude is less than the amplitude of the voltage charge on capacitor 117 which is coupled to the anode of the said diode switch at node 127. Conversely, the said sync signal causes diode switch 115 to be in a reverse biased, non-conducting state whenever the voltage amplitude of the sync signal is greater than the amplitude of the voltage charge on capacitor 117. Capacitor 117 is slowly charged from the DCPS positive output 110 through resistor 118 whenever diode switch 115 is not conducting and the said capacitor is rapidly discharged to DCPS common 111 through resistor 116 whenever the said diode switch is conducting. This slow charging and rapid discharging of capacitor 117 causes a sawtooth-like voltage waveform to be generated on node 127 in synchronism with each alternation of the said AC power source reference phase as is illustrated in FIG. 7A, waveform 705. Capacitor 119 couples the said sawtooth voltage on node 127 to a summing junction at node 126. A DC bias signal, derived from DCPS 102 positive output 110 by voltage divider resistor 120 and 121 is coupled from divider node 125 to the said summing junction by isolation diode 123. A resistance signal is also coupled to summing junction 126 via conductor 108. These signals are summed across resistor 122 resulting in a composite control signal illustrated in FIG. 7A, waveform 707. This composite control signal is coupled to the gate electrode of FET switch 124. The composite control signal acting on the gate of FET 124 causes the said FET to switch from an Rds OFF state to an Rds ON state whenever the said composite control signal voltage amplitude exceeds the switching threshold of the FET and, conversely, the FET will switch from an Rds ON state to an Rds OFF state whenever the composite control signal is less than the switching threshold of the said FET.

The drain electrode of FET 124 is coupled to conductor 109 and the source electrode of the said FET is coupled to DCPS common 111, thus conductor 109 will effectively be directly connected to DCPS 111 when FET 124 is switched ON and conductor 109 will effectively be an open circuit when the said FET is switched OFF.

The voltage amplitude of the composite control signal is at a constant maximum peak amplitude, i.e., 7.5 volts, so long as the speed of motor 10 is less than 95% of synchronous speed. This said peak amplitude of the composite control signal causes FET 124 to be switched to an Rds ON state for most of the duration of each voltage alternation of the AC power source 13 reference phase. As previously described herein, the resistance signal output of FVR 107 becomes operative when the motor 10 speed exceeds 95% of synchronous speed and the said resistance signal, by attenuation, varies the amplitude of the composite control signal, i.e., the composite control signal amplitude decreases as the FVR 107 resistance output decreases and the composite control signal amplitude increases as the FVR 107 resistance output increases, thus the composite control signal becomes amplitude modulated by FVR 107 at motor 10 speeds greater than 95% of synchronous speed, and since the FVR 107 resistance output is directly proportional to the load on motor 10 then the amplitude modulation of the composite control signal is also directly proportional to the said motor load, and, furthermore, since the Rds ON time of FET 124 decreases as the amplitude of the composite control signal decreases and vice-versa, then the Rds ON time of FET 124 varies directly proportional to the load on motor 10 above 95% of synchronous speed. The aforedescribed relationships between the various signals may be more fully understood by a study of the waveforms illustrated in FIG. 7A.

Figure 4:
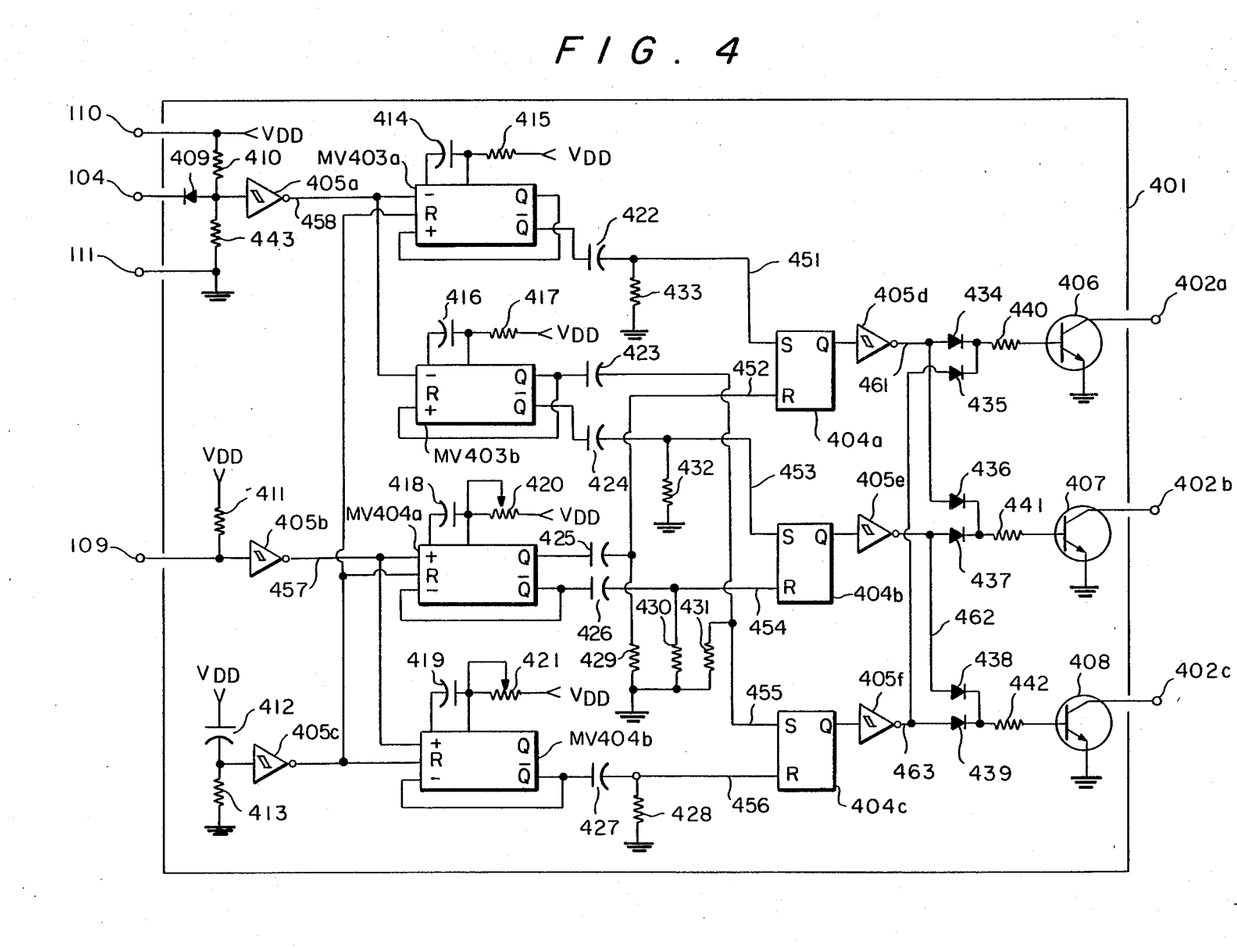
FIG. 4 is a schematic diagram of a preferred electronic circuit that performs the three phase converter function of the invention.
Figure 7B:
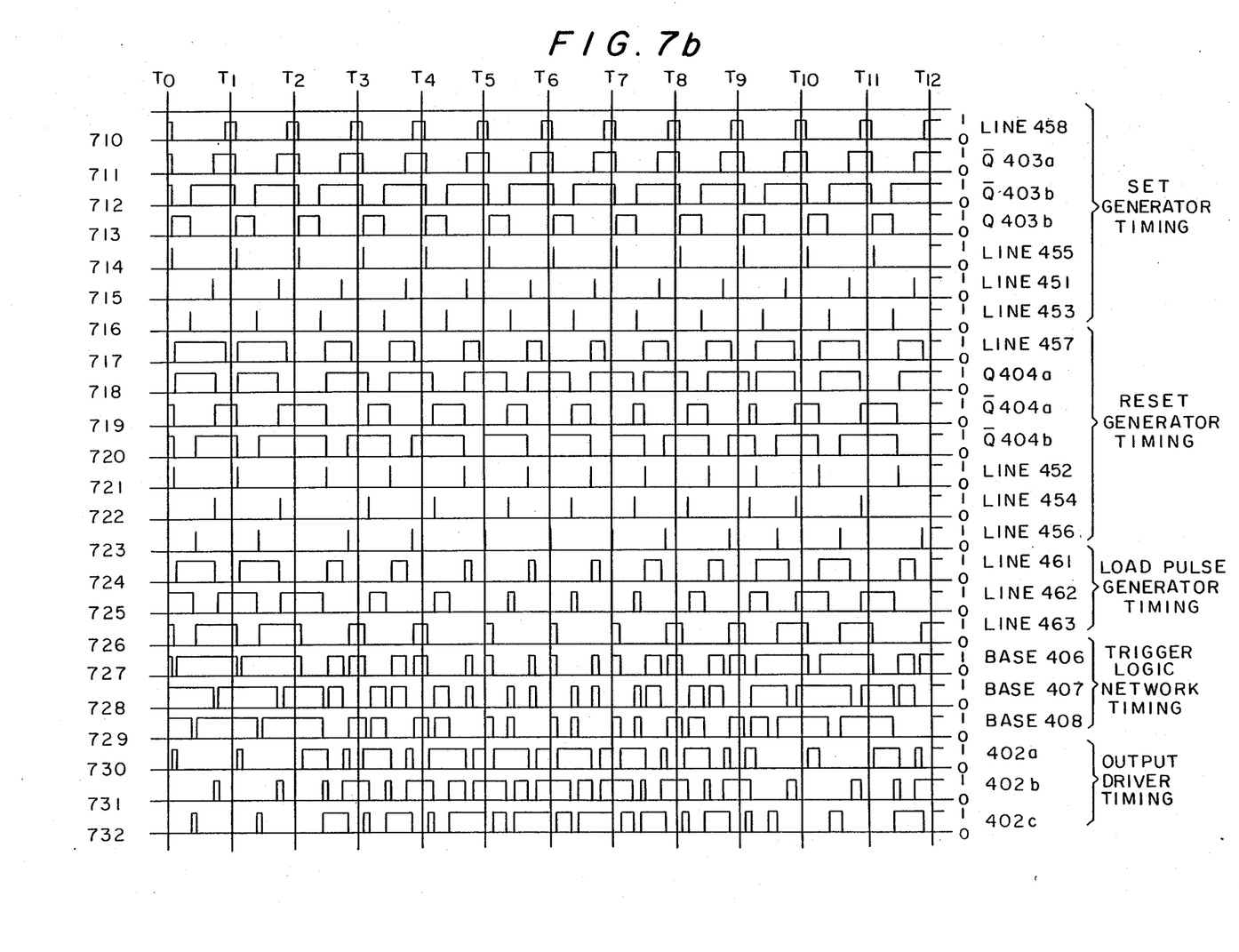

The following description and discussion of the operation of the single phase-to-three phase converter (TPC) 401 portion of the present invention is made in reference to FIG. 4 and FIG. 7B. FIG. 4 is a logic schematic diagram of a preferred electronic logic system means that comprises TPC 401. FIG. 7B is a logic timing diagram that illustrates the timing relationships between several critical logic waveforms appearing at certain points within the TPC 401 circuits. The TPC 401 digital logic network consists of four standard integrated circuit logic blocks, three transistors and associated passive components that are configured and timed to cooperatively form a single phase-to-three phase converter which comprises a reset delay generator means, a power on reset means, a three phase trigger logic means and output pulse driver means, all of which function interdependently to cause the ON-OFF output of PPS 106 which acts on conductor 109, in combination with the sync signal appearing on conductor 104, to be converted to three independent logic pulses that vary in pulse width according to the load on motor 10, that are separated by 120 electrical degrees, and that occur at the frequency of and during each voltage phase alternation of power source 13.

The set delay generator means is comprised of inverting Schmitt trigger 405a, voltage divider resistors 410 and 443, diode switch 409, dual digital monostable multivibrators MV 403a and MV 403b, timing capacitors 414 and 416, timing resistors 415 and 417, pulse coupling capacitors 422, 423 and 424, and pulse coupling resistors 431, 432 and 433.

The reset delay generator means is comprised of pull-up resistor 411, inverting Schmitt trigger 405b, dual digital monostable multivibrator MV 404a and MV 404b, timing capacitors 418 and 419, variable timing resistors 420 and 421, pulse coupling capacitors 425, 426 and 427 and pulse coupling resistors 428, 429 and 430.

The load pulse generator means comprises RS flip-flops 404a, 404b and 404c and inverting Schmitt triggers 405d, 405e and 405f.

The three phase trigger logic means includes diodes 434, 435, 436, 437, 438 and 439.

The output pulse driver means includes resistors 440, 441, 442 and transistors 406, 407 and 408.

The power on reset includes Schmitt trigger 405c, capacitor 412 and resistor 413.

The sync signal appearing on conductor 104 causes diode switch 409 to be in a forward biased conducting state whenever the said sync signal voltage amplitude is less than the DC voltage level appearing at the junction of voltage divider resistors 410 and 443 and, conversely, the said diode will switch to a reverse biased, non-conducting state whenever the said sync signal voltage amplitude is greater than the DC voltage level appearing at the said divider junction. The divider junction DC voltage level is reduced to a value, when diode switch 409 is conducting, that is less than the switching threshold of inverting Schmitt trigger (ST) 405a and the divider junction DC voltage level will increase to a DC voltage level that is greater than the ST 405a switching threshold whenever diode 409 is not conducting, thus the ST 405a output will switch from a logical 0 to a logical 1 whenever the sync signal causes diode 409 to conduct and the ST 405a output will switch back to a logical 0 whenever the sync signal causes diode 409 to stop conducting. A logic pulse of logical 1 value is thus produced at the output of ST 405a in coincidence with the time duration that the sync signal amplitude is less than the DC voltage level appearing at the said divider junction.

The logical 1 pulse output of ST 405a is coupled via line 458 to the negative edge trigger inputs of edge triggered digital monostable multivibrators MV 403a and MV 403b. The logic pulse output of ST 405a appearing on line 458 is illustrated in FIG. 7B as waveform 710.

The monostable multivibrators MV 403a and MV 403b function according to well known digital logic conventions whereby the Q and not-Q outputs are respectively triggered to logical 1 and logical 0 values coincident with, and as a result of, a logic state change from logical 1 to logical 0 occurring at their negative edge trigger inputs and the Q and not-Q outputs will remain in this triggered state for a time interval whose duration is determined by the value of RC timing components coupled to the interval timing inputs. The Q and not-Q outputs will, at the completion of the triggered state time interval, return to the non-triggered state wherein the Q output is a logical 0 and the not-Q output is a logical 1.

The triggered state time interval of MV 403a is set by the values of capacitor 414 and resistor 415 to equal 120 electrical degrees and the triggered state time interval of MV 403b is set by the values of capacitor 416 and resistor 417 to equal 60 electrical degrees, both relative to the frequency of AC power source 13.

Capacitor 422 and resistor 433 pulse couples the positive going edge of MV 403a not-Q output to the set (S) input of RS flip-flop 404a via line 451. Similarly, the not-Q output of MV 403b is pulse coupled by capacitor 424 and resistor 432 to the S input of RS flip-flop 404b via line 453 and the Q output of MV 403b is pulse coupled by capacitor 423 and resistor 431 to the S input of RS flip-flop 404c. The Q outputs of both MV 403a and MV 403b are also respectively fed back to the positive edge trigger inputs of MV 403a and MV 403b to prevent re-triggering until the completion of an RC timing interval.

MV 403a and MV 403b, in cooperation with ST 405a and the associated resistors, capacitors and a diode thusly form a digital set delay generator means that responds to a sync signal derived from the AC power source 13 reference phase in order to produce three independent pulses of short duration that are separated from one another by 60 electrical degrees. The purpose of these short duration pulses so separated will become more readily apparent by a study of waveforms 710 through 716 illustrated in FIG. 7B and from the following description of the other portions of TPC 401.

The reset delay generator means also produces three pulses of short duration that are separated by 60 electrical degrees relative to the frequency of AC power source 13 in a manner that is similar to that described herein for the set delay generator. The reset delay generator means, however, derives its input from the PPS 106 motor 10 load proportional ON-OFF signal output which is coupled to conductor 109. Conductor 109 is also coupled to the junction of resistor 411 and the input of ST 405b, thus the said junction will be at a DC voltage level equal to the positive output (110) of DCPS 102 whenever the PPS 106 output is OFF and, conversely, will be at zero volts DC when the PPS 106 output is ON which, in turn, causes ST 405b to produce a logic pulse at its output that is a logical 1 value when the PPS 106 output is ON and a logical 0 value when the PPS 106 output is OFF.

The ST 405b output is coupled to the positive edge trigger inputs of MV 404a and MV 404b via line 457, thus the logic pulse output of ST 405b appearing on line 457 causes the Q and not-Q outputs of MV 404a and MV 404b to switch to a triggered state coincident with the output of PPS 106 switching to an ON state. The variable time interval timing resistor 420 is adjusted in value so that the triggered time interval of MV 404a is equal to 120 electrical degrees and the variable timing resistor 421 is adjusted in value so that the triggered time interval of MV 404b is equal to 60 electrical degrees. The Q output of MV 404a is pulse coupled by capacitor 425 and resistor 429 to the reset (R) input of RS flip-flop 404a via line 452 and the not-Q output of MV 404a is pulse coupled by capacitor 426 and resistor 430 to the R input of RS flip-flop 404b via line 454. Similarly, the not-Q output of MV 404b is pulse coupled by capacitor 427 and resistor 428 to the R input of RS flip-flop 404c via line 456. The not-Q outputs of MV 404a and MV 404b are respectively fed back to the negative edge trigger inputs which prevents re-triggering during the triggered time intervals.

MV 404a and MV 404b, in cooperation with ST 405b and associated capacitors and resistors, produce the previously described three pulses of short duration each time the PPS 106 output is switched to an ON state.

The timing relationships of the reset delay generator portion of TPC 401 may be more readily understood by referring to waveforms 717 through 723 illustrated in FIG. 7B.

The load pulse generator means is comprised of RS flip-flops 404a, 404b, 404c, inverting Schmitt triggers 405d, 405e and 405f. The RS flip-flops, under the control of the set delay and reset delay generators, produce a logic 0 pulse at their respective Q outputs that vary in pulse width proportional to the load on motor 10. The logical 0 pulse outputs are inverted to logical 1 pulses by the inverting Schmitt triggers. The logical 1 pulse outputs of schmitt triggers 405d, 405e and 405f thus vary in pulse width coincident with the variable pulse width of the logical outputs of the RS flip-flops and these logical 1 pulses are then applied to a logic network that coordinates the logic 1 pulses into pulses trains that are so timed to phase control three phase power.

The RS flip-flops are standard logic blocks that function according to well known digital logic conventions whereby the Q output is set to a logical 1 state in response to a logic 1 pulse applied to the S input and the Q output is set to a logical 0 state in response to a logic 1 pulse applied to the R input. The Q output is bi-stable, thus it will remain indefinitely in the logical state to which it was last set by a logical 1 input to R or S. The Q output of 404a will switch to a logical 1 state in response to a logic 1 pulse appearing on line 451 which is coupled to the S input of the said flip-flop, and the said Q output will remain in the logical 1 state until a logic 1 pulse is applied to the R input via line 452 at which time the Q output will switch to a logical 0 state and remain in this state until such time that a logical 1 is once more applied to the S input via line 451 which returns the said Q output to a logical 1 state.

As previously noted herein, the logical 1 pulse appearing on line 451 occurs 120 electrical degrees after the reference phase sync signal causes a logical 1 to appear on line 458 of the set delay generator and also that the reference phase sync signal is coincident with the first, or A, phase output of AC power source 13, therefore the logical 1 pulse appearing on line 451 is coincident with the second, or B, phase of the said AC power source.

As is also previously noted herein, the logical 1 pulse appearing on line 452 is coincident with the logical 1 pulse appearing on line 457 of the reset generator which, in turn, is coincident with PPS 106 being ON; and PPS 106 being ON indicates that stator voltage shall be applied to motor 10 from AC power source 13, then, therefore, the Q output of RS flip-flop 404a is switched to a logical 0 state causing a logical 1 to appear on line 461 which is coupled to the output of inverting Schmitt trigger 405d. The logical 1 will remain on line 461 until such time that it is removed by a logical 1 pulse appearing on line 451 which causes the Q output of flip-flop 404a to return to a logical 1 state.

It shall be noted, as a comparison between waveforms 701 and 704 in FIG. 7A and FIG. 7B, waveform 710 illustrate, that the logical 1 pulse on line 458 of the set delay generator appears shortly before the zero crossing of the reference (A) phase and is removed shortly after the zero crossing of the said A phase, thus the logical 1 pulse appearing on line 451, as illustrated by waveform 715 in FIG. 7B, occurs shortly after the zero crossing of the second (B) phase of the said AC power source. Also, the logical 1 pulse appearing on line 453, illustrated as waveform 716 in FIG. 7B, occurs shortly after the zero crossing of the third (C) phase of AC power source 13 and the logic 1 pulse appears on line 455, as illustrated by waveform 714 in FIG. 7B, shortly after the zero crossing of the A phase of the said power source. The logical 1 pulses appearing on line 454 and line 456 that are respectively coupled to the R inputs of flip-flops (FF) 404b and 404c are, as previously noted herein, separated in time from the positive going edge of the logical 1 pulse appearing on line 457 of the reset delay generator by 120 electrical degrees on line 454 and by 60 electrical degrees on line 456; therefore, the Q output of FF 404c will, 60 electrical degrees after the logical 1 appears on line 457, switch to a logical 0 causing a logical 1 to appear on line 463 that remains until a logical 1 appears on line 455 and similarly the Q output of FF 404b will, 120 electrical degrees after the appearance of a logical 1 on line 457, switch to a logical 0 state thereby causing a logical 1 to appear on line 462 that remains until a logical 1 appears on line 456. In this manner the load pulse generator produces logical 1 pulses coupled to lines 461, 462 and 463 that are timed to occur during each of the voltage alternation sequences of AC power source 13 phases A, B and C and that vary in pulse width directly proportional to the ON time of the PPS 106 output, and since the PPS 106 output is directly proportional to the load on motor 10, then the pulse width of the load pulse generator outputs are also directly proportional to the said load on motor 10 as illustrated in FIG. 7B wherein waveform 724 is the load pulse generator output for the A phase, waveform 725 is for the B phase and waveform 726 for the C phase. The load pulse generator outputs are coupled to the trigger logic network by lines 461, 462 and 463.

The trigger logic network is comprised of three passive dual input OR gates that function to combine the load pulse generator logical 1 outputs into a logical sequence of pulses that result in a well known three phase triggering sequence used to phase control the stator voltage of three phase induction motors using thyristor switches. The said well known trigger sequence is logically defined as: $Trg.A = (A.\overline{B}) + (\overline{A}.B)$; $Trg.B = (B.\overline{C}) + (\overline{B}.C)$; $Trg.C = (C.\overline{A}) + (\overline{C}.A)$. As thoroughly analyzed in published data, this logical triggering sequence assures that pairs of stator windings are energized in a manner that results in predictable motor behavior when the stator voltage is switched partial sine waves resulting from thyristor phase control. The trigger logic network A phase OR gate is comprised of diodes 434 and 435; the B phase OR gate is comprised of diodes 436 and 437; the C phase OR gate is comprised of diodes 438 and 439. The load pulse generator outputs are coupled to these gates in the logical sequence: Trg.$A=A+C$; Trg.$B=B+A$; Trg.$C=C+B$; which is a combinational form of the well known logic whereby the A phase and C phase load pulses are combined, the B Phase and A phase load pulses are combined, and the C phase and B phase load pulses are combined. The resulting logically combined load pulse waveforms are illustrated in FIG. 7B with waveform 727 being phase A, waveform 728 being phase B and waveform 729 being phase C.

The OR gate outputs are coupled by current limiting resistors to the TPC 401 output drivers comprised of Phase A driver transistor 406, phase B driver transistor 407 and phase C driver transistor 408. The collector of phase A driver is coupled to conductor 402a, the collector of phase B driver is coupled to conductor 402b, and the collector of phase C driver is coupled to conductor 402c. The driver transistors are in open collector configuration and serve as current sinking line drivers which allow conductors 402a, 402b and 402c to be of long length without degrading the TPC 401 output pulses. The OR gate trigger logic pulses are inverted by the output driver transistors which results in the trigger logic pulses appearing on conductors 402a, 402b and 402c to be in NOR logic form as is illustrated in FIG. 7B, waveforms 730, 731 and 732.

It should be noted that the TPC 401 self compensates for the normal variations that occur in the frequency of the AC power source 13, i.e., a nominal AC power source frequency of 60 Hz typically can vary from 59 Hz to 61 Hz over a 24 hour period. The TPC 401 set delay generator outputs, which normally are fixed in time while the reset delay generator output shifts in time as determined by the load on motor 10, will shift in time relative to the reference phase zero crossing which shifts in time relative to the frequency of the AC power source 13. Since the logic 1 pulse appearing on line 458 of the set delay generator is fixed in time by the sync signal and the sync signal tracks the reference phases voltage zero cross, then the said logic 1 pulse on line 458 will also track the reference phase voltage zero cross and, since the set delay generator output pulses track the negative edge of the line 458 logic pulse, then these said outputs will similarly track the reference phase voltage zero cross, and since the set delay pulses are timed to occur shortly after the voltage zero crossings of each of the three phases of the AC power source, then a decrease in the AC power source frequency cannot cause a timing malfunction of the logic and likewise an increase in the AC power source frequency cannot cause a timing error.

The power on reset portion of TPC 401 insures that the TPC 401 logic is initialized to the proper state whenever power is first applied to the energy economizer and/or if power is momentarily interrupted. The power on reset includes capacitor 412, resistor 413 and ST 405c. A DC voltage equal to the DCPS 102 positive output (110) will be pulse coupled to the junction of capacitor 412, resistor 413 and the input to ST 405c which causes the ST 405c output to switch to a logical 0 state. The output of ST 405c is coupled to the reset input of the digital monostable multivibrators MV 403a, MV 403b, MV 404a and MV 404b. A logical 0 applied to the said reset inputs causes the Q and not-Q outputs to be latched into a non-triggered state so long as the logical 0 is present regardless of any logic pulses appearing at either the positive or negative edge trigger inputs. The said logic 0 reset output of ST 405c will switch to a logical 1 whenever the DC voltage on the said junction of capacitor 412 and resistor 413 decreases to a voltage level less than the switching threshold of ST 405c. This reset action sets the initial conditions for TPC 401 to function according to the timing previously described herein and as shown in the waveforms illustrated in FIG. 7B.

Figure 5:
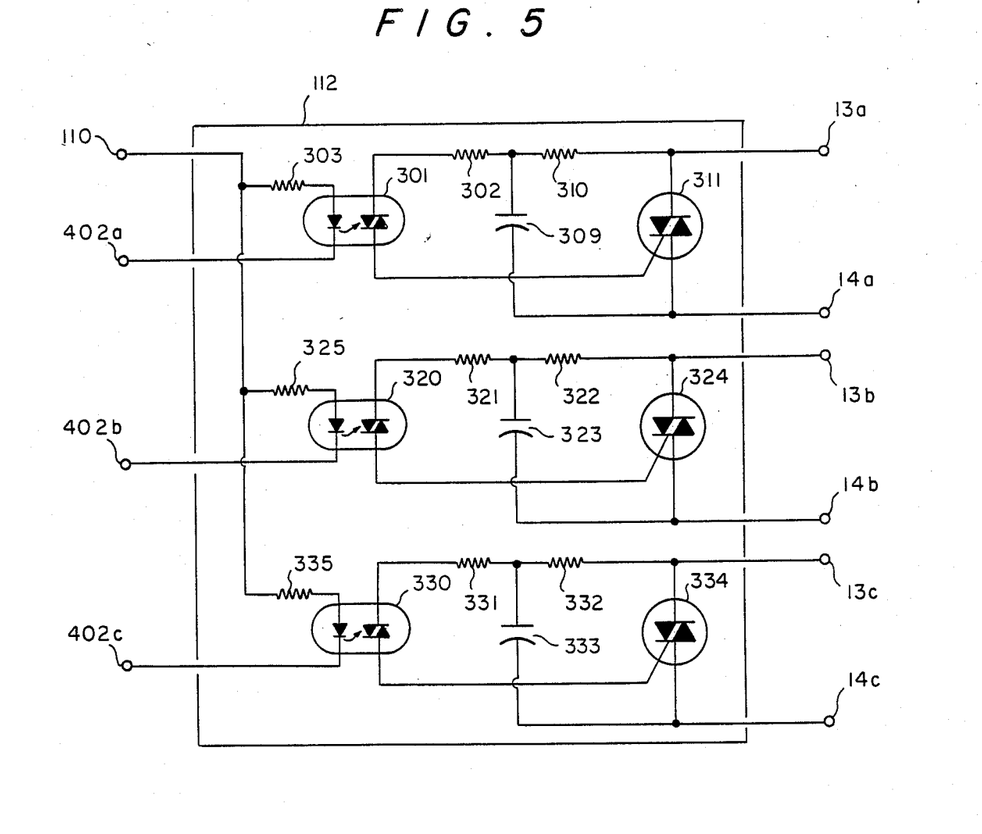
FIG. 5 is a schematic diagram of a preferred circuit that performs the solid state AC power switch function of the invention.

A preferred circuit comprising SSPS 112 is illustrated in FIG. 5 and, as shown therein, includes three independently operative power switching networks of identical circuit configuration which shall hereinafter be referred to as SSPS 112 phase A, SSPS 112 phase B, and SSPS 112 phase C.

Each of the said power switching networks is comprised of a trigger coupling means, a dv/dt snubber means and a thyristor means which cooperatively function to switch power from AC power source 13 to the stator windings of motor 10 when commanded to do so by the outputs of TPC 401.

SSPS 112 phase A is comprised of resistors 302, 303 and 310, capacitor 309, optocoupler 301 and bi-directional triode thyristor (Triac) 311.

SSPS 112 phase B is comprised of resistor 321, 322 and 325, capacitor 323, optocoupler 320 and Triac 324.

SSPS 112 phase C is comprised of resistors 331, 332 and 335, capacitor 333, optocoupler 330 and Triac 334.

SSPS phase A, in response to TPC 401 A phase logic 0 output, controls the time duration that each voltage alternation of AC power source 13 phase A appearing on line 13a is coupled by Triac 311 to motor 10 stator windings via line 14a. Similarly, SSPS 112 phase B, in response to TPC 401 B phase logic 0 output, controls the time duration that AC power source 13 phase B voltage alternations are coupled to line 14b from line 13b by Triac 324 and SSPS 112 phase C, in response to TPC 401 C phase logic 0 output, controls the time duration that AC power source 13 phase C voltage alternations are coupled to line 14c from line 13c by Triac 334.

Each of the SSPS 112 independently operative power switches is triggered into an ON, or conducting, state whenever a logical 0 is applied to their respective optocoupler trigger inputs.

The SSPS 112 phase A optocoupler (opto) 301 trigger input is connected to line 402a, thus current will flow from line 110 of DCPS 102 through current limiting resistor 303 and the opto 301 trigger element whenever a logical 0 is applied to line 402a by the TPC 401 A phase output driver which, in turn, causes the opto 301 output, according to well known optoelectronic principles, to latch into an ON, or conducting, state. Current flows from the AC power source 13 through resistor 310, resistor 302 and opto 301 output into the gate electrode of Triac 311 whenever the opto 301 output is ON which causes Triac 311 to then latch into an ON, or conducting state. AC power source 13 phase A voltage is applied to line 14a from line 13a whenever Triac 311 is ON. Triac 311 will remain, once turned ON, in a conducting state until such time that current flow between lines 13a and 14a is nearly zero at which time the said Triac will switch to an OFF, non-conducting, state and will remain OFF until such time that opto 301 is again turned on by a logical 0 appearing on line 402a.

Similarly, a logical 0 applied to line 402b causes current to flow from line 110 of DCPS 102 through resistor 325 and the opto 320 trigger input, thereby latching the opto 320 output to an ON state which causes current to flow from AC power source phase B through resistors 322 and 321 into the gate of Triac 324 turning it ON thereby coupling the AC power source 13 phase B on line 13b to line 14b; and also, in a similar manner, Triac 334 is turned on by opto 330 being latched to an ON state in response to a logical 0 on line 402 causing current to flow from DCPS line 110 through resistor 335 and opto 330 trigger input which causes current to flow from AC power source 13 phase C on line 13c through resistors 332, 331 and the opto 330 output into the gate of Triac 334 which latches the said Triac ON thereby coupling the AC power source 13 phase C voltage on line 13c to line 14c.

Figure 7C:
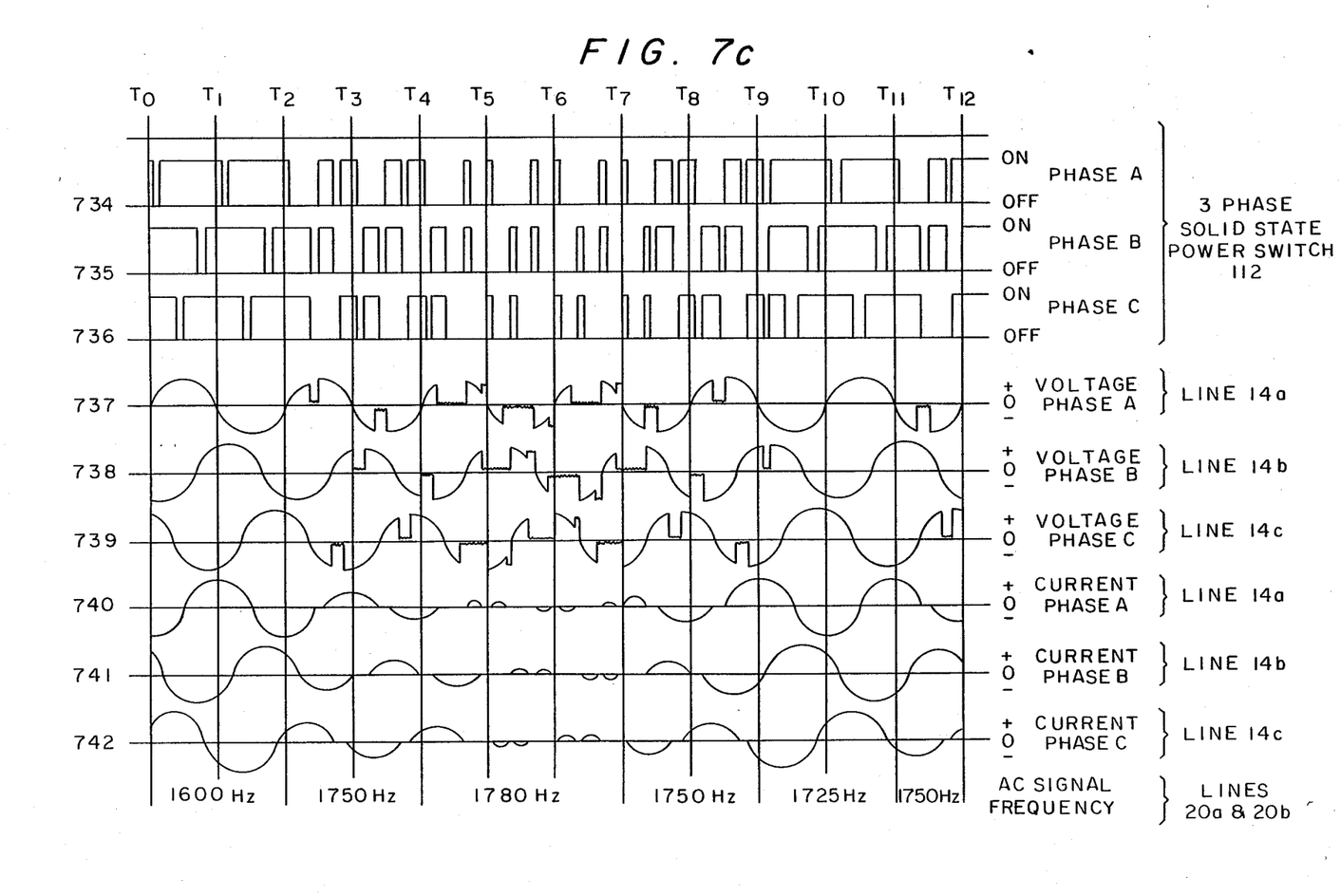

The timing relationships between the ON states of the three phases of SSPS 112, the voltages applied to the motor 10 stator windings and the resulting stator current that, in turn, result from the energy economizer responding to frequency modulation of the AC signal on lines 20a and 20b may be better understood by referring to FIG. 7C wherein: waveforms 734, 735 and 736 respectively illustrate the response of SSPS 112 to the TPC 401 output driver logic on lines 402a, 402b and 402c; waveforms 737, 738 and 739 respectively illustrate the resulting voltage alternations applied to lines 14a, 14b and 14c; waveforms 740, 741 and 742 respectively illustrate the resultant stator current on lines 14a, 14b and 14c.

It should be noted that, although the stator windings 11a, 11b and 11c of motor 10 illustrated in FIG. 1 are connected in delta configuration, the present invention performs as described herein if the said stator windings are connected in a wye configuration. The selection of delta connections in FIG. 1 is solely for ease of illustration.

Also it should be noted that the waveforms illustrated in FIGS. 7A, 7B and 7C are time correlated to twelve voltage alternations of the reference (A) phase of AC power source 13; thus, they may be viewed simultaneously for study by aligning the time reference lines T 0 through T 12.

Such a correlative time study of the said waveforms may more readily illustrate how the single phase energy economizer of the herein referenced previous invention which is comprised of AC generator 18, frequency variable resistance 107, PPS 106, DC power supply 102 and a single phase AC power switch, all of which operate interdependently to control the stator power of a single phase induction motor proportional to the load-of-a-moment may be inexpensively made to control the stator power of a three phase induction motor proportional to the load-of-a-moment by the addition of a simple, low cost, digital logic network TPC 401 coupled to the output of PPS 106 and the replacement of the single phase AC power switch, controlled by the PPS 106 output in the previous invention, with a three phase AC power switch controlled by the TPC 401 outputs in the present invention.

We have herein thus described the principle embodiments of the present invention, and it is understood that aspects thereof may be implemented by other means, i.e., the FET switch 124 in PPS 106 may be replaced with a Schmitt trigger, a differential voltage comparator, or any other type of threshold switching means and so forth. Therefore, while the present invention has been described herein with reference to a specific embodiment thereof, it will be obvious to those skilled in the art that various changes and modifications may be made without departing from the invention in its broader aspect.

We claim:

1. An energy economizing AC power control system for energizing an induction motor, comprising a three phase induction motor having a rotor and a plurality of stator windings, a three phase sine wave power supply, three controllable solid state power switching means disposed respectively between the three phase outputs of said power supply and the stator windings of said motor for energizing respective ones of said stator windings, means responsive to the speed of rotation of the rotor of said motor for producing an AC signal that is frequency modulated in relation to the load on said motor, variable resistance means responsive to said frequency modulated AC signals for producing a resistance whose magnitude varies with variations in the frequency modulation of said AC signal, AC power proportioning switch means coupled to said variable resistance means for producing a single phase output having a parameter which varies in relation to the load on said motor, means coupled to said power supply for generating a synchronizing signal that varies in synchronism with the alternations of said power supply, a single phase-to-three phase converter jointly responsive to said synchronizing signal and said output signal of said AC power proportioning switch means for producing three control signals comprising time spaced pulses that occur respectively at the frequency of and during each voltage alternation of said power supply and whose pulse widths vary with variations in the load on said motor, and means coupling said varying width pulse control signals to respective ones of said three solid state power switching means for controlling the time duration that each alternation of said three phase power supply is coupled via an associated one of said power switching means to an associated motor stator winding.

2. The energy economizing system of claim 1 wherein said variable resistance means comprises a field effect transistor whose drain electrode is coupled to said AC power proportioning switch means, and input circuit means coupled to the gate electrode of said field effect transistor and responsive to modulation frequencies of said AC signal corresponding to speeds of rotation of the rotor of said motor which are at least 95% of motor synchronous speed for varying the effective resistance between the drain and source electrodes of said field effect transistor.

3. The energy economizing system of claim 2 wherein said input circuit means comprises a series resonant tuned power amplifier.

4. The energy economizing system of claim 3 wherein said means for producing an AC frequency modulated signal comprises an AC generator coupled to the rotor shaft of said motor, and means coupling the output of said AC generator to said series resonant tuned power amplifier.

5. The energy economizing system of claim 1 wherein said AC power proportioning switch means comprises a sawtooth generator coupled to the input of a field effect transistor, said sawtooth generator being responsive to said synchronizing signal for generating a sawtooth voltage in synchronism with one of the phase of said AC power supply, and means jointly responsive to said sawtooth voltage and to the magnitude of said variable resistance to render said field effect transistor conductive during an alternation of said AC power supply for a period of time that varies with variations of the load on said motor.

6. The energy economizing system of claim 1 including a two position switch disposed between said variable resistance means and said AC power proportioning switch means, and a potentiometer connected to said switch, said two position switch being operative in one of its positions to connect said variable resistance means to said AC power proportioning switch means and being operative in the other of its said positions to disconnect said variable resistance means from said AC power proportioning means thereby to permit manual control of the motor stator winding energization by variation of said potentiometer.

7. The energy economizing system of claim 6 wherein said two position switch is manually operable.

8. The energy economizing system of claim 1 wherein said single-phase-to three phase converter comprises reset delay generator means, set delay generator means, load pulse generator means, power on reset means, three phase trigger logic means, and output pulse driver means interconnected to one another and jointly responsive to said synchronizing signal and to the on-off conductivity of said field effect transistor for generating logic pulses that vary in pulse width according to the load on said motor.

9. An energy economizing AC power control system for energizing the stator windings of a three phase induction motor comprising a three phase power supply, an AC generator connected to the motor rotor shaft of said induction motor for generating an AC signal that is frequency modulated in response to load induced speed variations of the motor rotor, a variable resistance whose magnitude is responsive to said frequency modulated signal, an AC power proportioning switch which is operative to produce a single phase output consisting of pulses whose widths vary with variations in the magnitude of said variable resistance, a single phase-to-three phase power supply, and three solid state switches that are respectively controlled by said control signals for controlling the time duration that each alternation of said three phase power supply is coupled via an associated one of said solid state switches to an associated one of the stator windings in said motor.

10. The energy economizing system of claim 9 including switch means operable to replace said variable resistance by a manually variable potentiometer to permit manual control of the motor stator winding energization during starting of said motor.

* * * * *